(12) United States Patent
Gambatese

(10) Patent No.: US 7,641,250 B2
(45) Date of Patent: Jan. 5, 2010

(54) BODY MOLDING WITH INTEGRAL LOCK FOR A VEHICLE

(75) Inventor: Brady James Gambatese, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 271 days.

(21) Appl. No.: 11/741,248

(22) Filed: Apr. 27, 2007

(65) Prior Publication Data
US 2008/0263991 A1    Oct. 30, 2008

(51) Int. Cl.
*B62D 25/07* (2006.01)
*B60J 10/00* (2006.01)
*F16J 15/02* (2006.01)

(52) U.S. Cl. .................. 296/1.08; 24/292; 24/297; 49/492.1; 52/466; 52/716.5; 296/93; 296/213

(58) Field of Classification Search .............. 24/289, 24/292, 297; 49/489.1, 492.1, 495.1, 496.1, 49/498.1; 52/466, 468, 716.1, 716.4, 716.5, 52/716.6, 716.7, 717.05, 718.01, 718.03, 52/718.04; 293/126; 296/1.08, 93, 210, 296/213; 428/31, 36.9, 99, 217
See application file for complete search history.

(56) References Cited

U.S. PATENT DOCUMENTS

| | | | | |
|---|---|---|---|---|
| 1,804,831 A | * | 5/1931 | Hardesty | .................... 52/716.7 |
| 2,230,303 A | * | 2/1941 | Leguillon | ..................... 404/65 |
| 2,659,940 A | * | 11/1953 | Beck | ......................... 49/498.1 |
| 2,954,592 A | * | 10/1960 | Parsons | ..................... 49/482.1 |
| 3,074,134 A | * | 1/1963 | Buechler | ..................... 24/289 |
| 3,286,425 A | * | 11/1966 | Brown | ..................... 52/396.06 |
| 3,634,991 A | | 1/1972 | Barton, Jr. et al. | |
| 3,738,074 A | | 6/1973 | Tucker | |
| 4,122,583 A | * | 10/1978 | Grittner et al. | ............. 24/703.1 |
| 4,246,303 A | | 1/1981 | Townsend et al. | |
| 4,478,020 A | | 10/1984 | Jackson | |
| 4,792,180 A | * | 12/1988 | Jacobsen et al. | ............ 296/210 |
| 4,904,014 A | | 2/1990 | Azarovitz et al. | |
| 4,920,618 A | * | 5/1990 | Iguchi | ........................ 24/453 |

(Continued)

FOREIGN PATENT DOCUMENTS

JP    01190533 A    *    7/1989

(Continued)

*Primary Examiner*—Glenn Dayoan
*Assistant Examiner*—Paul A Chenevert
(74) *Attorney, Agent, or Firm*—Gifford, Krass, Sprinkle, Anderson & Citkowski, P.C.

(57) ABSTRACT

A body molding with integral lock feature that is located within a channel formed in a body of a vehicle includes an elongated cover portion that is generally planar, with opposed side edges, an upper surface and a lower surface and opposed side edges. A retention member projects radially from the lower surface of the cover portion. The retention member includes at least two links interconnected via a joint, and each link is formed from a thermoplastic material having a predetermined link durometer. The joint is made from a thermoplastic material having a predetermined joint durometer. The link durometer is greater than the joint durometer, so that the retention member has a first predetermined shape prior to installation in the channel and a second predetermined shape after installation in the channel, to maintain the retention member in the channel via interference contact between a contacting joint and the channel.

27 Claims, 4 Drawing Sheets

U.S. PATENT DOCUMENTS

| | | | |
|---|---|---|---|
| 4,929,487 A * | 5/1990 | Tilman et al. | 428/163 |
| 4,930,279 A | 6/1990 | Bart et al. | |
| 5,007,202 A | 4/1991 | Guillon et al. | |
| 5,013,083 A * | 5/1991 | Yada et al. | 296/213 |
| 5,065,960 A * | 11/1991 | Castellucci | 244/131 |
| 5,074,089 A * | 12/1991 | Kemmer et al. | 52/395 |
| 5,118,157 A * | 6/1992 | Tamura | 296/93 |
| 5,178,919 A | 1/1993 | Mimura et al. | |
| 5,202,172 A | 4/1993 | Graf | |
| 5,409,746 A | 4/1995 | Mimura et al. | |
| 5,413,398 A * | 5/1995 | Kim | 296/210 |
| 5,509,182 A * | 4/1996 | Nakanishi | 24/297 |
| 5,560,175 A | 10/1996 | Soyka, Jr. et al. | |
| 5,561,961 A | 10/1996 | Paul et al. | |
| 5,771,652 A * | 6/1998 | Nagata et al. | 52/716.5 |
| 5,829,825 A * | 11/1998 | Kim | 296/210 |
| 5,964,979 A * | 10/1999 | George et al. | 156/309.6 |
| 6,615,459 B2 * | 9/2003 | Sano | 24/453 |
| 6,695,397 B2 * | 2/2004 | Kamiya et al. | 296/210 |
| 6,826,883 B2 | 12/2004 | Guzman et al. | |
| 6,877,798 B2 * | 4/2005 | Nakajima et al. | 296/210 |
| 6,974,181 B2 * | 12/2005 | Mikkaichi et al. | 296/210 |
| 7,004,535 B1 * | 2/2006 | Osterberg et al. | 296/203.03 |
| 7,045,189 B2 * | 5/2006 | Hui et al. | 428/99 |
| 7,243,401 B2 * | 7/2007 | Sawatani | 24/297 |
| 7,407,224 B2 * | 8/2008 | Okabe et al. | 296/210 |
| 2002/0101096 A1 * | 8/2002 | Nagasawa | 296/210 |
| 2002/0180246 A1 * | 12/2002 | Nagashima et al. | 296/210 |
| 2003/0038510 A1 * | 2/2003 | Yoon | 296/210 |
| 2005/0189793 A1 * | 9/2005 | Wato et al. | 296/210 |
| 2008/0277973 A1 * | 11/2008 | Mourou | 296/210 |
| 2009/0021053 A1 * | 1/2009 | Harberts et al. | 296/213 |
| 2009/0051183 A1 * | 2/2009 | Mourou et al. | 296/1.08 |

FOREIGN PATENT DOCUMENTS

| | | | |
|---|---|---|---|
| JP | 05213119 A * | 8/1993 | |
| JP | 06001185 A * | 1/1994 | |
| JP | 06219163 A * | 8/1994 | |
| JP | 06247221 A * | 9/1994 | |
| JP | 06298011 A * | 10/1994 | |

* cited by examiner

BODY MOLDING WITH INTEGRAL LOCK FOR A VEHICLE

FIELD OF THE INVENTION

The present invention relates generally to a body molding for a vehicle, and more specifically to a body molding with an integral lock that is disposed within a channel formed in the body of the vehicle.

BACKGROUND OF THE INVENTION

A vehicle body, such as that of an automobile, frequently includes a plurality of panels joined together to form the shape of the vehicle. The panel may be a body panel, a window panel, or the like. The juncture of the panels typically forms a seam, and the seam may be contained within a channel. In another example, the vehicle body may include a channel formed in the panel. Although the channel may be functionally necessary, it may be aesthetically displeasing or may provide a place for dirt, moisture or the like to accumulate. A body molding may be positioned in the channel, in order to cover the channel. One example of a body molding is a Mohican molding, which are long skinny plastic strips that covered up weld marks on the car's roof and which are disposed in the channel formed by the seam between a roof panel and a body side panel.

The body molding is typically an elongated member that includes a cover portion and a retention portion that securely holds the molding in place within the channel. While existing body moldings work well, they may be difficult to install within the channel, or may be easily dislodged from the channel. Thus, there is a need in the art for an improved body molding that is easier to install and is more positively retained within the channel formed in the body of the vehicle.

SUMMARY OF THE INVENTION

Accordingly, the present invention is a body molding with integral lock feature that is located within a channel formed in a body of a vehicle. The body molding includes an elongated cover portion that is generally planar, with an upper surface and a lower surface and opposed side edges. A retention member projects radially from the lower surface of the cover portion. The retention member includes at least two links interconnected via a joint, and each of the links is formed from a thermoplastic material having a predetermined link durometer. The joint is made from a thermoplastic material having a predetermined joint durometer. The link durometer is greater than the joint durometer, so that the retention member has a first predetermined shape prior to installation in the channel and a second predetermined shape after installation in the channel, to maintain the retention member in the channel via interference contact between a contacting joint and the channel.

One advantage of the present invention is that an improved body molding with a locking feature is provided. Another advantage of the present invention is that the improved body molding has a multi-link retention portion for ease of installation in a channel. Still another advantage of the present invention is that the multi-link retention portion body includes a living joint formed between links, and the joint is of a lower durometer than that of the link. A further advantage of the present invention is that the retention portion is compressible. Still a further advantage of the present invention is that the body molding has a lock feature integrally formed in the retention member to maintain the installed position of the molding within the channel.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
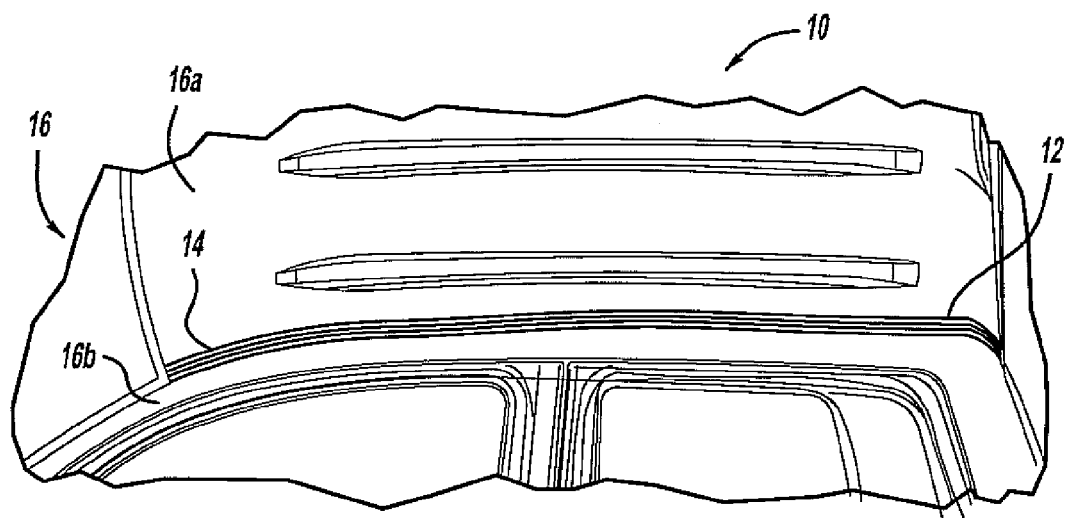
FIG. 1 is a diagrammatic view illustrating a body molding with integral lock feature installed in a channel formed on a vehicle, according to the present invention.

Referring to FIGS. 1-6b, a vehicle 10 having a body molding with integral lock feature is illustrated. The body molding 12 is disposed in a channel 14 formed in a panel 16, such as the channel 14 formed between the roof panel 16a and a body panel 16b of the vehicle 10. It should be appreciated that the body molding 12 can be disposed in any channel 14 associated with the vehicle 10. For example, the channel 14 may be formed in a body panel 16b, or formed by a seam 18 joining body panels, or formed by a seam 18 joining a body panel and a glass panel, or the like. The molding 12 advantageously serves as a decorative cover over the channel 14, as well as a seal for the channel 14. In this example, the walls 20 of the channel 14 generally form a U-shape, although other configurations are contemplated. Further, opposed walls 20 of the channel 14 may be inclined towards each other, to facilitate retention of the body molding in the channel.

The body molding with integral lock feature is an elongated member, and includes a cover portion 22 and a retention portion. The cover portion 22 is a generally planar member, having an upper surface 32a, a lower surface 32b, and opposed outer edges 24. When installed in the channel 14, the cover portion 22 extends across an opening 26 formed between the opposed walls 20 of the channel 14. As shown in this example, the outer edges 24 of the cover portion 22 are positioned adjacent a contact surface of the panel 16, as shown at 28. It should be appreciated that the contact surface 28 may be integrally formed as part of the channel 14, or located outside of the channel 14. The extension of the outer edges 24 of the cover portion 22 beyond the channel opening 26 assists in sealing the channel 14. The cover portion 22 is made from a flexible material, such as an extruded thermoplastic, rubber, PVC, TPO or TPV or the like. It should be appreciated that the selection of material is non-limiting. It should also be appreciated that the cover portion may be of a laminate construction, and an outer layer may be is decorative in appearance. For example, the outer layer may be a metalized plastic material.

The cover portion 22 may include a finger member 30 extending from the outer edge 24. In this example, the finger member is adjacent a lower surface of the cover 22, and extends inwardly towards a center of the cover portion 22. The finger 30 is flexible, and is compressed when the body molding 12 is installed in the channel, in order to accommodate any dimensional tolerances within the panel 16, or seam 18, or channel 14 or the like.

The body molding 12 also includes a retention member 34 projecting radially from a lower surface 32b of the cover portion 22. The retention member 34 includes a plurality of flexible links 36, each connected together by a joint 38. In this example, each link 36 is generally a bar-shaped member, although other shapes are contemplated. The links 36 cooperatively assist in retaining the body molding 12 within the channel 14. The links 36 are formed from an extrudable, flexible material, such as a thermoplastic, rubber, PVC, TPO, or TPV or the like. The links 36 may be made from the same material as the cover portion 22. The links 36 have a predetermined durometer. It should be appreciated that the link durometer may be different than the cover portion durometer.

Figure 3:
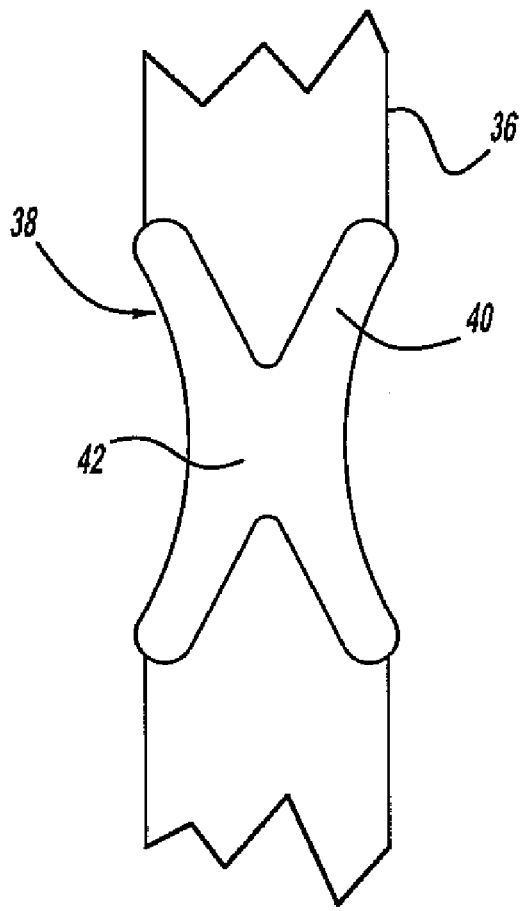
FIG. 3 is an elevational view of a joint in a retention portion of the body molding with integral lock feature of FIG. 2, according to the present invention.
Figure 4:
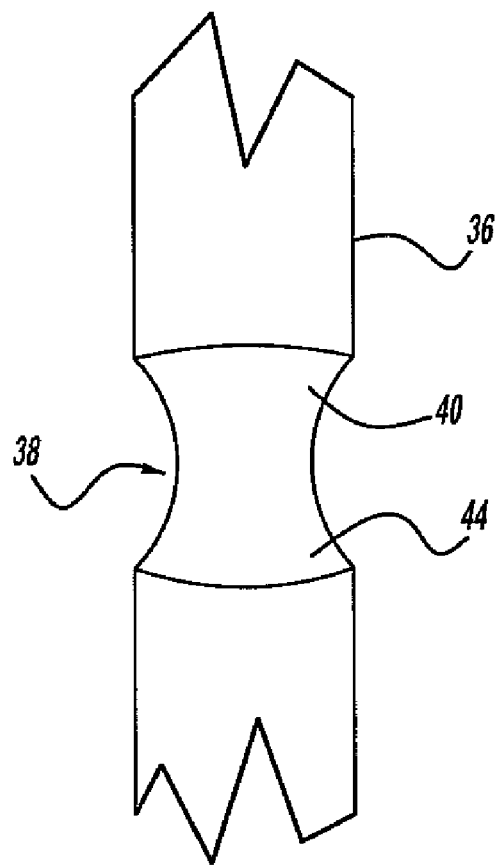
FIG. 4 is an elevational view of another embodiment of the joint in a retention portion of the body molding with integral lock feature of FIG. 2, according to the present invention.

The retention member 34 includes a joint 38 interconnecting the links 36, or a link and the cover portion 22. The joint 38 is a thin wall section of material having a predetermined shape and predetermined durometer. The joint durometer is less than the link durometer. In an example, the joint 38 has an X-shape, as shown in FIG. 3 at 42. The ends 40 of the joint 38 are attached to a link 36. In another example shown in FIG. 4 at 44, the joint 38 has an hourglass shape, with side walls that taper inwardly toward the middle of the joint. The ends 40 of the joint 38 are attached to a link 36. The joint is formed from a material, such as extrudable, flexible material, such as a thermoplastic, rubber, PVC, TPO, or TPV or the like. It should be appreciated that the lower joint durometer than the link durometer allows the joint to flex during insertion of the retention member 34 into the channel 14.

The interconnected links 36 and joints 38 cooperatively form a multi-bar linkage having a polygonal shape for retaining the molding 12 in the channel 14. In this example, a six-bar linkage is illustrated by way of example, although greater or fewer links and joints may be utilized. It should be appreciated that the number of links and joints is determinable by various factors, such as size of the channel, or link material, or joint material, or retention force or the like. In this example, the links and joints form a hexagonal shape, although other polygonal shapes are contemplated.

Figure 5A:
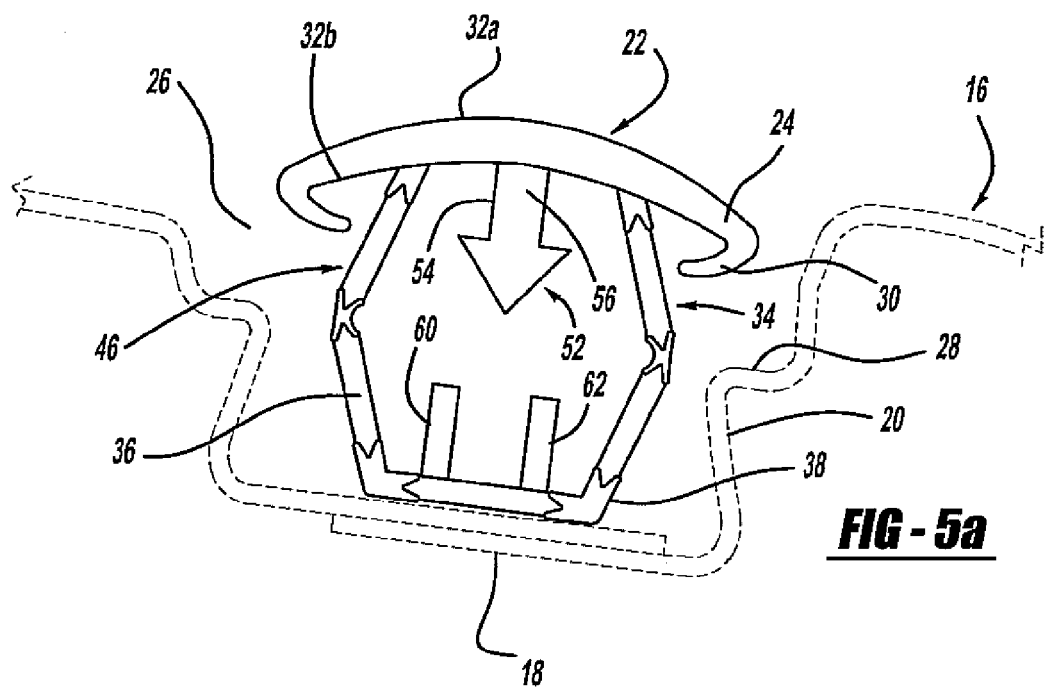
FIG. 5a is an elevational view of the body molding with integral lock feature prior to installation, according to the present invention.
Figure 5B:
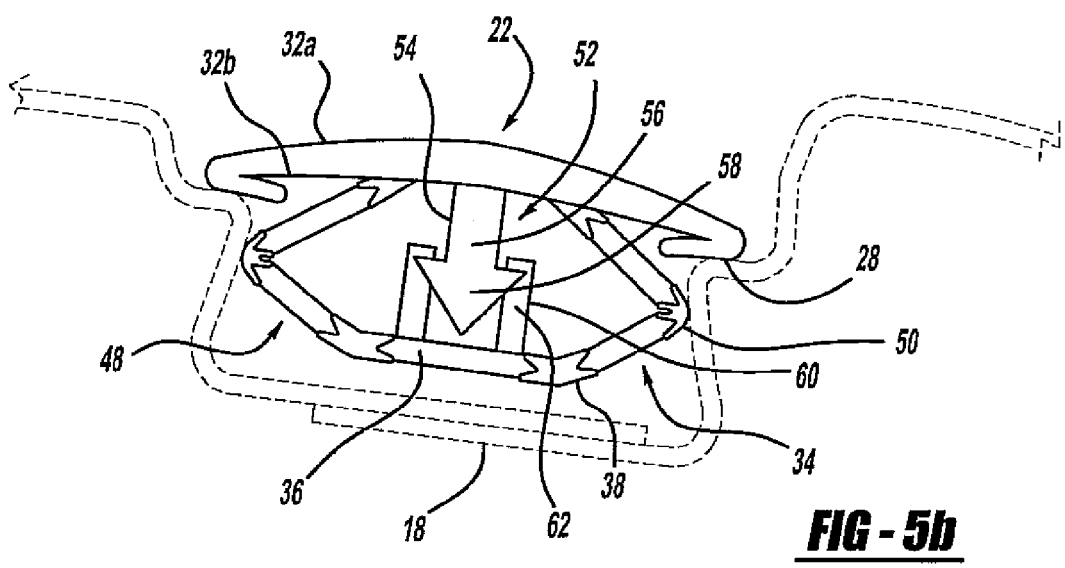
FIG. 5b is an elevational view of the installed body molding with integral lock, according to the present invention.
Figure 6A:
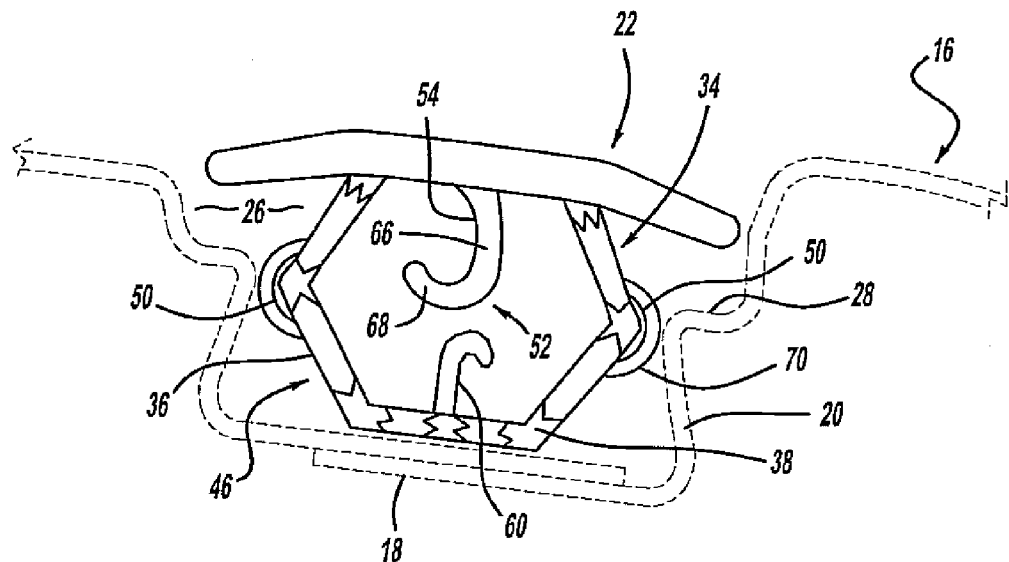
FIG. 6a is an elevational view of the body molding prior to installation with another embodiment of an integral lock feature, according to the present invention.
Figure 6B:
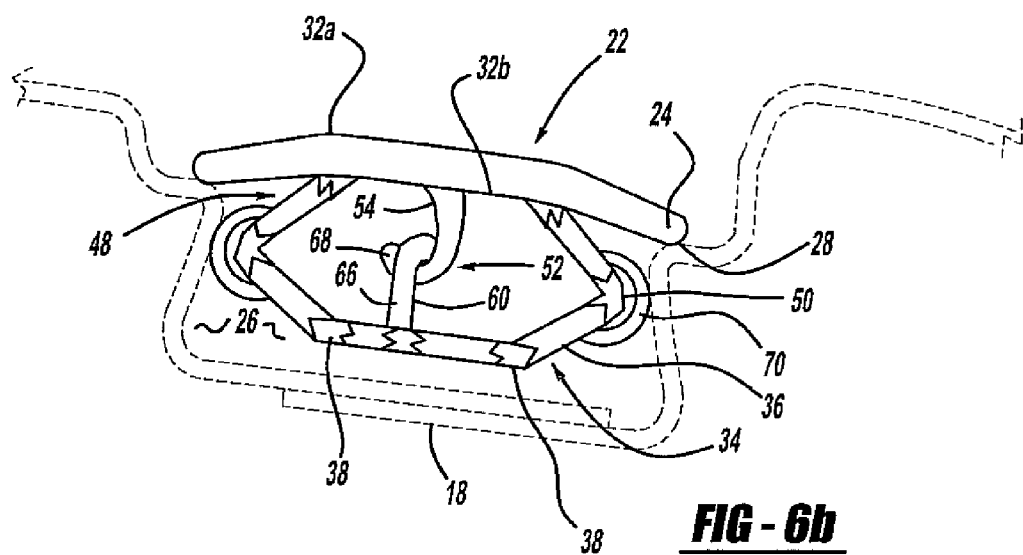
FIG. 6b is an elevational view of the installed body molding with integral lock of FIG. 6a, according to the present invention.

The interconnected links 36 and joints 38 have a first shape prior to installation of the retention member 34 into the channel 14, and a second shape after installation. The first shape is defined by a first angular relationship between adjacent link members prior to installation, as shown in FIGS. 5a and 6a at 46. Further, the second shape is formed by insertion of the retaining portion into the channel, thus forming a second angular relationship between adjacent link members after installation, as shown in FIGS. 5b and 6b at 48. At least one joint is in interference contact with the channel, in order to retain the molding in the channel as shown at 50. In this example, two contacting joints 50 are in interference contact with the corresponding walls 20 of the channel 14. The inclined walls 20 of the channel assist in retaining the retention member in the channel 14.

The body molding 12 also includes a locking mechanism 52 for fixedly holding the retention member 34 in the channel 14 by locking in place the second shape 48 and corresponding second angular position of the interconnected links and joints. The locking mechanism 52 includes a first interlocking member 54 detachably connected to a second interlocking member when the retention member has assumed the second shape 48. As shown in the example of FIGS. 5a and 5b, the locking mechanism 52 includes a first interlocking male member 54 fixedly retained by a second interlocking female member 60. The first interlocking male member 54 projects radially from a lower surface 32b of the cover portion 22. The first interlocking male member 54 has an elongated shank portion 56 and a triangularly shaped head portion 58 on an outermost end of the shank portion 56. The second interlocking female member 60 includes two adjacent walls 62 projecting radially from a link. The upper end of the side wall 62 may include a finger portion (not shown) that extends inwardly towards the opposed wall to assist in retention of the first interlocking male member 54. The two adjacent walls 62 are spaced a predetermined distance apart, so as to retain the first interlocking member 54 by the second interlocking member 60 through an interference fit. The locking mechanism 52 is formed using a material having a suitable durometer.

Figure 2:
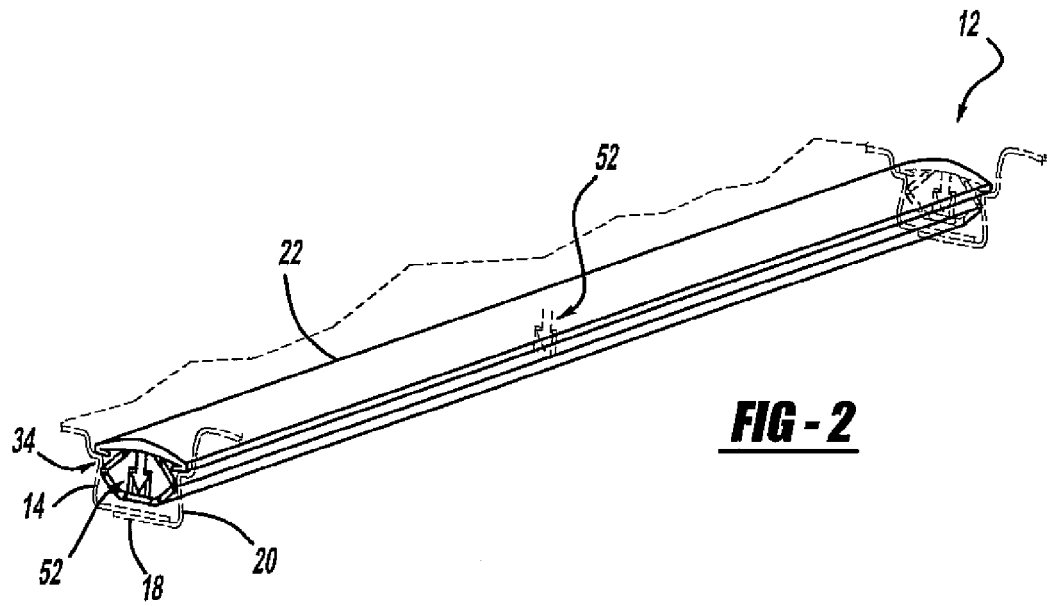
FIG. 2 is a perspective view of a body molding with integral lock feature, according to the present invention.

The body molding 12 may include one or more integrally formed locking mechanisms 52. For example, the locking mechanism 52 may be positioned at one end, or both ends of the body molding, as well as interspersed at predetermined locations along the body molding, as shown in FIG. 2. The number of locking mechanisms 52 and positioning is dependent on various factors, such as the length of the body molding 12, or the size of the channel 14, or shape of the channel 14 or desired retention force, or the like.

In an alternative embodiment shown in FIGS. 6a and 6b, the first interlocking member 54 projects radially from the lower surface 32b of the cover portion 22 and includes an elongated shank portion 66 with a curved head portion 68, to form a "J" shape. The second interlocking member 60 projects radially from a link that is opposite the lower surface 32 of the cover portion 22, and is similar in shape to the first interlocking member 54, It should be appreciated that the second interlocking member 60 could have another shape, such as a "U" shape or the like. The first interlocking member 54 interlocks with the second interlocking member 60, to forceably hold the contacting joint 50 against the channel walls 20 while maintaining the second position 48 of the retention member 34, so as to lock the molding 12 within the channel 14.

The body molding 12 may include additional features. For example, the retention member 34 may include an integrally formed bumper 70 as shown in FIGS. 6a and 6b, to accommodate dimensional tolerances between the retention member 34 and channel walls 20. In this example, the bumper 70 is a semicircular member positioned adjacent the contacting joint 50. The bumper 70 is formed from a material, such as extrudable, flexible material, such as a thermoplastic, rubber, PVC, TPO, or TPV or the like. It should be appreciated that the bumper 70 may have a durometer that is lower than the link durometer, to allow the bumper to compress when retained in the channel.

It should be appreciated that the body molding 12 may include any of the above described features in any combination. Further, the body molding 12 is extruded as an integral member incorporating these features.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A body molding with integral lock feature located within a channel formed in a body of a vehicle, the body molding comprising:
   an elongated cover portion that is generally planar, with an upper surface and a lower surface and opposed outer edges extending along the elongated direction, wherein the cover portion is made from an extrudable, flexible material;
   a retention member projecting radially from the lower surface of the cover portion, wherein the retention member includes at least two links interconnected via a joint, and each of the links formed from an extrudable thermoplastic material having a predetermined link durometer, and the joint is made from an extrudable thermoplastic material having a predetermined joint durometer, and the link durometer is greater than the joint durometer, so that the retention member has a first predetermined shape prior to installation in the channel; and
   a locking mechanism for fixedly holding the retention member in the channel by locking the interconnected links in a second predetermined shape after installation in the channel, to maintain the retention member in the channel via interference contact between a contacting joint and the channel.

2. The body molding as set forth in claim 1 wherein the elongated cover portion further includes a flexible finger member extending from the outer edges of the cover portion.

3. The body molding as set forth in claim 1 wherein the link is a bar-shaped member.

4. The body molding as set forth in claim 1 wherein the joint has an "X" shape, and an end of the joint is connected to an end of the link.

5. The body molding as set forth in claim 1 wherein the joint has an hourglass shape, and an end of the joint is connected to an end of the link.

6. The body molding as set forth in claim 1 wherein the first predetermined shape is generally hexagonal.

7. The body molding as set forth in claim 1 wherein opposed contacting joints are in interference contact with the channel when the interconnected links form the second predetermined shape.

8. The body molding as set forth in claim 1 wherein the retention portion includes a compressible bumper positioned adjacent the contacting joint.

9. The body molding as set forth in claim 1 wherein the locking mechanism includes a first interlocking member detachably connected to a second interlocking member.

10. The body molding as set forth in claim 9 wherein the first interlocking member has an elongated shank portion and a triangularly shaped head portion on an outermost end of the shank portion, and the second interlocking member has two adjacent walls spaced a predetermined distance apart, to retain the first interlocking member between the walls through an interference fit.

11. The body molding as set forth in claim 9 wherein the first interlocking member has an elongated shank portion and a curved head portion, so as to form a "J" shape.

12. A body molding with integral lock feature located within a channel formed in a body of a vehicle, the body molding comprising:
    an elongated cover portion that is generally planar, with an upper surface and a lower surface and opposed outer edges extending along the elongated direction;
    a retention member projecting radially from the lower surface of the cover portion, wherein the retention member includes at least two links interconnected via a joint, and each of the links being formed of a thermoplastic material having a predetermined link durometer, and the joint being formed of a thermoplastic material having a predetermined joint durometer, and the link durometer is greater than the joint durometer, so that the retention member has a first predetermined shape prior to installation in the channel and a second predetermined shape after installation in the channel, to maintain the retention member in the channel via interference contact between a contacting joint and the channel, and
    wherein the body molding includes at least one locking mechanism for fixedly holding the retention member in the channel by locking the interconnected links in the second predetermined shape.

13. The body molding as set forth in claim 12 wherein the locking mechanism includes a first interlocking member detachably connected to a second interlocking member.

14. The body molding as set forth in claim 13 wherein the fast interlocking member has an elongated shank portion and a triangularly shaped head portion on an outermost end of the shank portion, and the second interlocking member has two adjacent wails spaced a predetermined distance apart, to retain the first interlocking member between the walls through an interference fit.

15. The body molding as set forth in claim 13 wherein the first interlocking member has an elongated shank portion and a curved head portion, so as to form a "J" shape.

16. The body molding as set forth in claim 13 wherein the retention portion includes a compressible bumper positioned adjacent the contacting joint.

17. A body molding with integral lock feature located within a channel formed in a body of a vehicle, the body molding comprising:
    an elongated cover portion that is generally planar, with an upper surface and a lower surface and opposed outer edges extending along the elongated direction;
    a retention member projecting radially from the lower surface of the cover portion, wherein the retention member includes at least two links interconnected via a joint having an "X" shape, and an end of the joint is connected to an end of the link, and each of the links being formed of a thermoplastic material having a predetermined link durometer, and the joint being formed of a thermoplastic material having a predetermined joint durometer, and the link durometer is greater than the joint durometer, so that the retention member has a first predetermined shape prior to installation in the channel and a second predetermined shape after installation in the channel, to maintain the retention member in the channel via interference contact between a contacting joint and the channel.

18. The body molding as set forth in claim 17 wherein the elongated cover portion further includes a flexible finger member extending from the outer edges of the cover portion.

19. The body molding as set forth in claim 17 wherein the cover portion is made from an extrudable, flexible material.

20. The body molding as set forth in claim 17 wherein the link is a bar-shaped member.

21. The body molding as set forth in claim 17 wherein the first predetermined shape is generally hexagonal.

22. The body molding as set forth in claim 17 wherein opposed contacting joints are in interference contact with the channel when the interconnected links form the second predetermined shape.

23. A body molding with integral lock feature located within a channel formed in a body of a vehicle, the body molding comprising:
- an elongated cover portion that is generally planar, with an upper surface and a lower surface and opposed outer edges extending along the elongated direction, wherein the cover portion is made from an extrudable, flexible material;
- a retention member projecting radially from the lower surface of the cover portion, wherein the retention member includes at least two links interconnected via a joint, and each of the links is formed from a thermoplastic material having a predetermined link durometer, and the joint is made from a thermoplastic material having a predetermined joint durometer, and the link durometer is greater than the joint durometer, so that the retention member has a first predetermined shape prior to installation in the channel; and
- at least one locking mechanism connected to the retention member for fixedly holding the retention member in the channel by locking the interconnected links in a second predetermined shape after installation in the channel, to maintain the retention member in the channel via interference contact between a contacting joint and the channel, wherein the locking mechanism includes a first interlocking member detachably connected to a second interlocking member.

24. A body molding with integral lock feature located within a channel formed in a body of a vehicle, the body molding comprising:
- an elongated cover portion that is generally planar, with an upper surface and a lower surface and opposed outer edges extending along the elongated direction;
- a retention member projecting radially from the lower surface of the cover portion, wherein the retention member includes at least two links interconnected via a joint having an hourglass shape, and an end of the joint is connected to an end of the link, and each of the links being formed of a thermoplastic material having a predetermined link durometer, and the joint being formed of a thermoplastic material having a predetermined joint durometer, and the link durometer is greater than the joint durometer, so that the retention member has a first predetermined shape prior to installation in the channel and a second predetermined shape after installation in the channel, to maintain the retention member in the channel via interference contact between a contacting joint and the channel.

25. A body molding with integral lock feature located within a channel formed in a body of a vehicle, the body molding comprising:
- an elongated cover portion that is generally planar, with an upper surface and a lower surface and opposed outer edges extending along the elongated direction;
- a retention member projecting radially from the lower surface of the cover portion, wherein the retention member includes at least two links interconnected via a joint, and each of the links being formed of a thermoplastic material having a predetermined link durometer, and the joint being formed of a thermoplastic material having a predetermined joint durometer, and the link durometer is greater than the joint durometer, so that the retention member has a first predetermined shape having a first predetermined width prior to installation in the channel and a second predetermined shape having a second predetermined width after installation in the channel, the second predetermined width being wider than the first predetermined width such that when in the second predetermined width the retention member is maintained in the channel via interference contact between a contacting joint and the channel.

26. A body molding with integral lock feature located within a channel formed in a body of a vehicle, the body molding comprising:
- an elongated cover portion that is generally planar, with an upper surface and a lower surface and opposed outer edges extending along the elongated direction;
- a retention member projecting radially from the lower surface of the cover portion, wherein the retention member includes at least two links extending from the lower surface, and each of the links are interconnected via a joint and each of the links being formed of a thermoplastic material having a predetermined link durometer, and the joint being formed of a thermoplastic material having a predetermined joint durometer, and the link durometer is greater than the joint durometer, so that the retention member has a first predetermined shape prior to installation in the channel and a second predetermined shape after installation in the channel, to maintain the retention member in the channel via interference contact between a contacting joint and the channel.

27. A body molding with integral lock feature located within a channel formed in a body of a vehicle, the body molding comprising:
- an elongated cover portion that is generally planar, with an upper surface and a lower surface and opposed outer edges extending along the elongated direction;
- a retention member projecting radially from the lower surface of the cover portion, wherein the retention member includes a pair of joints attached to the lower surface of the cover portion, and a series of at least four links extending from one of the pair of joints to the other of the pair of joints, and each of the links of the series are interconnected via a joint, and each of the links being formed of a thermoplastic material having a predetermined link durometer, and the joint being formed of a thermoplastic material having a predetermined joint durometer, and the link durometer is greater than the joint durometer, so that the series of at least four links has a first predetermined shape prior to installation in the channel and a second predetermined shape after installation in the channel, to maintain the retention member in the channel via interference contact between a contacting joint and the channel.

* * * * *

UNITED STATES PATENT AND TRADEMARK OFFICE
CERTIFICATE OF CORRECTION

| | | |
|---|---|---|
| PATENT NO. | : 7,641,250 B2 | Page 1 of 1 |
| APPLICATION NO. | : 11/741248 | |
| DATED | : January 5, 2010 | |
| INVENTOR(S) | : Brady James Gambatese | |

It is certified that error appears in the above-identified patent and that said Letters Patent is hereby corrected as shown below:

Column 6, line 22 replace "fast" with --first--

Signed and Sealed this

Twentieth Day of April, 2010

David J. Kappos
*Director of the United States Patent and Trademark Office*